Aug. 9, 1949. J. L. PETTUS 2,478,780
LIGHT APERTURE CONSTRUCTION FOR
SOUND PROJECTOR DEVICES
Filed March 30, 1948 2 Sheets-Sheet 1
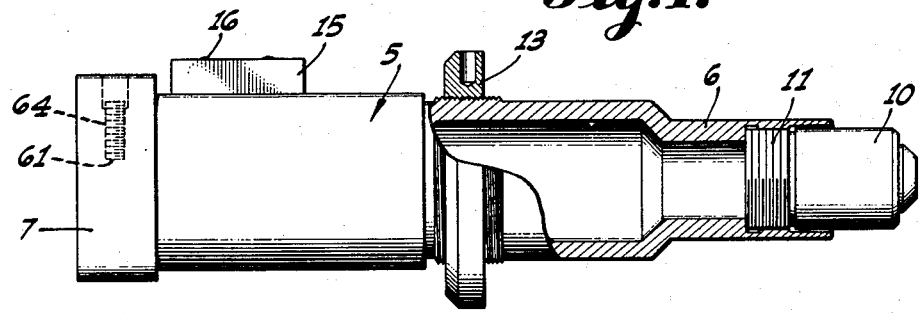
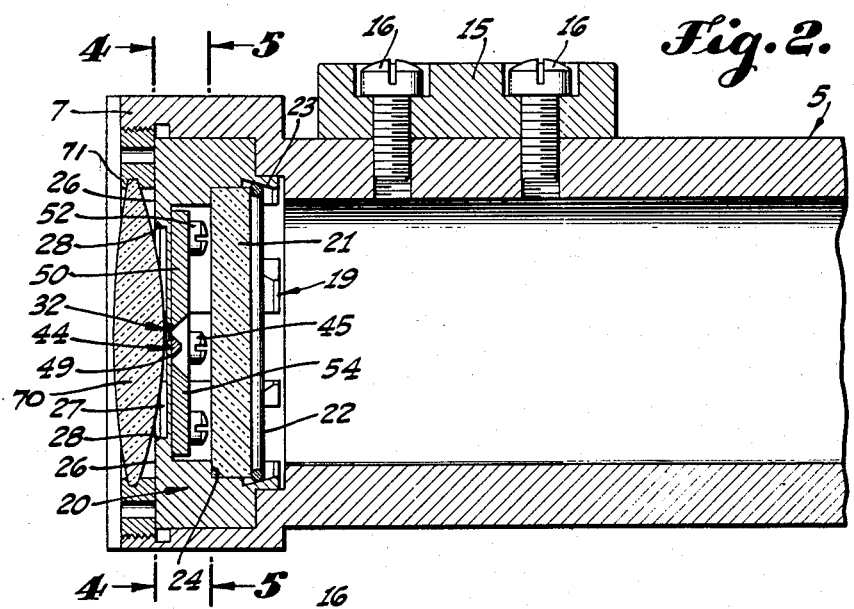
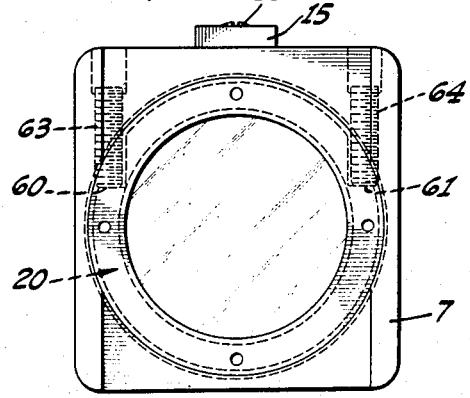
James L. Pettus,
INVENTOR.
BY
ATTORNEY Aug. 9, 1949.   J. L. PETTUS   2,478,780
LIGHT APERTURE CONSTRUCTION FOR
SOUND PROJECTOR DEVICES Filed March 30, 1948   2 Sheets-Sheet 2

James L. Pettus,
INVENTOR.

BY Orl R. Goolsaer
ATTORNEY

Patented Aug. 9, 1949

2,478,780

UNITED STATES PATENT OFFICE 2,478,780

LIGHT APERTURE CONSTRUCTION FOR SOUND PROJECTOR DEVICES

James L. Pettus, North Hollywood, Calif., assignor to Radio Corporation of America, a corporation of Delaware Application March 30, 1948, Serial No. 18,019

8 Claims. (Cl. 88—24)

This invention relates, in general, to the optical portion of sound recording systems, and particularly, to the light defining slits upon which a particularly shaped light beam is impressed and over which the beam is vibrated in accordance with a signal being recorded.

The particular type of slit aperture or apertures and the recording system in which the slits are employed are shown in Dimmick copending U. S. application, Ser. No. 629,294, filed November 17, 1945, now Patent No. 2,468,047, dated April 26, 1949, and Dimmick copending U. S. application, Ser. No. 742,545, filed April 19, 1947, now Patent No. 2,468,049, dated April 26, 1949. In these copending applications, the type of recording system is one whereby the same recorder will record either a negative type of sound record or a direct positive type of sound record, depending upon the adjustment of the galvanometer, which adjustment may be very rapidly made by a pivoted mounting therefor. The features which make such a recorder function for producing both types of records is in the shape of the light beam forming aperture and in the arrangement of the slits over which the beam is vibrated.

The present invention is directed to an adjustable optical unit mount which permits the accurate forming and positioning of the slits in their relationship with respect to the position of the light beam impressed thereon. The slit mask has three slits, one long slit extending over the major portion of the beam, and two shorter slits at the ends of the long slit, but spaced therefrom, normal to the slit, a predetermined distance. These slits must have uniform widths throughout their lengths, and they must all have parallel axes, the axes of the shorter slits being in alignment. The axes of the shorter slits must also be a predetermined distance from the axis of the longer slit. The present invention is a mechanical construction for forming the slits in their proper dimensions and relationships to one another and with respect to the light beam.

The principal object of the invention, therefore, is to facilitate the formation of a plurality of light slits in an optical system.

Another object of the invention is to provide an improved light slit construction for a sound recording system.

A further object of the invention is to provide an improved mechanical construction for forming and adjusting a plurality of light slits in their proper relationship to one another and to a light beam.

A still further object of the invention is to provide a mechanical slit forming construction which is easily adjustable as to width and orientation with respect to a light beam.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Fig. 1 is a side view, partly in cross-section, of an optical unit embodying the invention.

Fig. 2 is a cross-sectional view of that portion of the optical unit of Fig. 1 embodying the invention.

Fig. 3 is an end view of the optical unit of Figs. 1 and 2.

Figure 4:
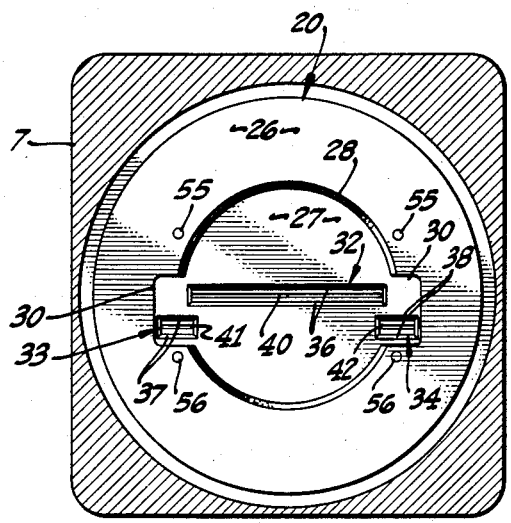
Fig. 4 is a cross-sectional view taken along the line 4—4 of Fig. 2.

Referring now to the drawings, in which the same numerals identify like elements, an optical unit comprises a barrel casing 5 having a small diameter section 6 and a rectangular end section 7, the latter enclosing a light filter, light aperture unit, and a condenser lens, while the section 6 holds a projection unit 10 threaded into the casing as shown at 11. A ring 13, the sides of which abut the sides of a slot in the barrel holder (not shown), is threaded on the external surface of casing 5 for adjusting the barrel 5 along the optical axis of the unit for focusing the light apertures on the film. A slide block 15 within a groove in the barrel holder is attached to the casing 5 by screws 16 and prevents rotation of the barrel 5 during the rotation of the adjusting ring 13.

Referring now to the remaining figures, the enlarged portion 7 of the barrel casing 5 has inserted therein a cylinder or cylindrical ring 20 having a back spider annulus 19 with a tapered internal angular surface 23, against which a split ring 22 is positioned to hold a light filter 21 against the shoulder 24 of the cylinder 20. Referring particularly to Fig. 4, the front face of the cylinder 20 has a surface 26 and an indented surface 27, the two surfaces being connected by a taper 28. The surface 27 is cut out at its ends, as shown at 30, to provide for three openings 32, 33, and 34, the opening 32 being between beveled edges 36, the opening 33 being between beveled edges 37, and the opening 34 being between beveled edges 38. The opening 32 is shown in cross-section in Fig. 2.

Figure 5:
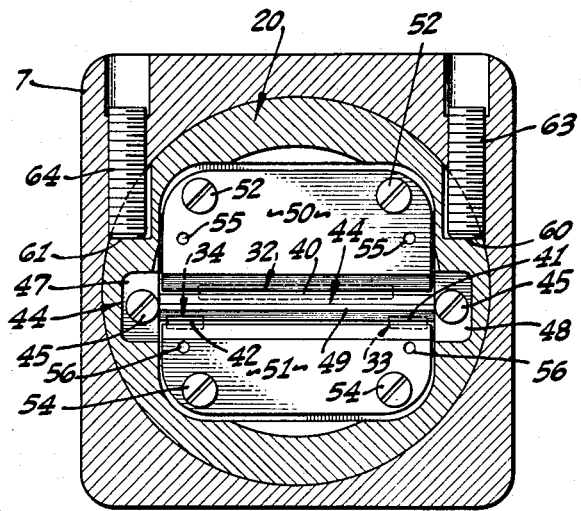
Fig. 5 is a cross-sectional view taken along the line 5—5 of Fig. 2.
Figure 6:
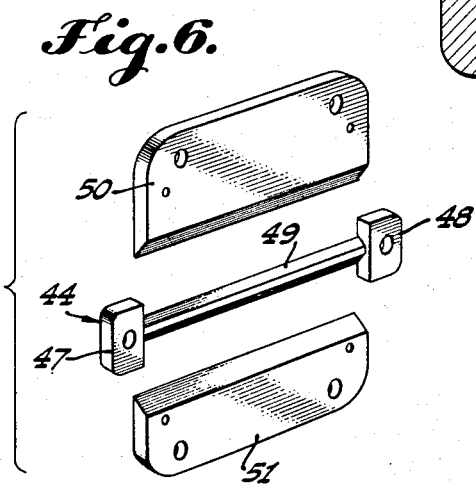
Fig. 6 is an expanded perspective view of the adjustable portion of the slit structure shown in Fig. 2.

Referring now to Figs. 4, 5, and 6, the actual light passing apertures or slits, as shown at 40, 41, and 42 in Figs. 4 and 5, are partially produced by the upper and lower edges of a bar member 44 attached by screws 45. This bar member 44 has end portions 47 and 48 which have a thickness of approximately .05 inch and a central portion 49 having a trapezoidal cross-section, as shown in Fig. 2, and approximately .03 inch in thickness. Mounted above the bar 44 and attached by screws 52, is an upper plate 50, and, mounted below the bar, is a lower plate 51 attached by screws 54. These plates have a thickness of approximately .05 inch. The diameter of the holes in plates 50 and 51 through which the screws 52 and 54 pass are larger than the cylindrical portion of the screws so that the plates may be moved toward and away from the bar 44 and slightly rotated. This permits the lower edge of upper plate 50 to be adjusted with respect to the upper edge of bar 44 to provide the long light slit 40 of uniform width along its length and a slit of the desired width. The two shorter slits 41 and 42 are similarly, properly dimensioned by adjusting the upper edge of plate 51 with respect to the lower edge of bar 44. After the plates have been properly adjusted, plate 50 is doweled to cylinder 20 by dowels 55, while dowels 56 fix the plate 51 with respect to bar 44.

To orient the slits, the cylinder 20 is rotatable in the section 7 of the barrel 5, the cylinder 20 having notches on either side of its axis with flat seats 60 and 61. A pair of screws 63 and 64, threaded through section 7 and having their ends bearing on the seats, provide the means for rotating the cylinder 20, and, consequently, the slits 40, 41, and 42. This is accomplished by backing one screw off and advancing the other, both screws being tightened at the correct position of the slits. The usual condenser lens 70 is mounted in an externally threaded ring 71 which is threaded in the end of section 7.

The above construction, therefore, provides a special type of optical slit unit, which permits forming slits of the desired width and uniformity over their lengths, and permits their orientation with respect to the axis of a light beam. This feature thus adds to the efficiency of a negative-direct positive recording system.

I claim:

1. An optical unit for defining a light beam into a plurality of beams having predetermined sizes and positional relationships comprising a holder, a hollow cylinder rotatably mounted in said holder, said cylinder having a face plate with a plurality of openings therein, a bar fixedly attached to said plate and having light defining edges passing over said openings to form one side of each of a plurality of light passing apertures, said sides thus being provided with a definite predetermined relationship with respect to one another, a pair of elements, one on either side of said bar, the edge of one of said elements passing over one of said openings to form the other side of one of said light passing apertures and the edge of the other of said elements passing over said other openings to form the other sides of said other light passing apertures, and means for adjusting said elements with respect to said light defining edges of said bar.

2. An optical unit in accordance with claim 1, in which said bar has a trapezoidal cross-section, said elements are tapered, and a threaded ring on said holder is provided for axially adjusting said cylinder, and a filter and holding means therefor are provided on the back end of said cylinder.

3. An optical unit in accordance with claim 1, in which said bar has a trapezoidal cross-section, said elements are tapered, and said cylinder has notches on each side of the axis of said cylinder, and screws are provided through said holder and in said notches to adjustably rotate said cylinder.

4. An optical unit comprising a hollow casing, a projection lens at one end of said casing, a light gathering and light beam forming unit at the other end of said casing, said last mentioned unit including a cylinder having a front face plate with elongated apertures therein and a light element and mounting means at the rear end thereof, an elongated bar member having a trapezoidal cross-section and having one edge thereof extending over one aperture and the other edge thereof extending over the other apertures, a plate on one side of said bar element and having an edge passing over said first mentioned aperture and adjustable with respect to one edge of said bar element, and a second plate on the other side of said bar element and having an edge adjacent the other edge of said bar element and adjustable with respect thereto, said edge passing over said other apertures.

5. An optical unit in accordance with claim 4, in which the edges of said bar member and said plate members passing over said apertures are tapered away from said condenser lens, and a condenser lens is mounted adjacent said apertures.

6. An optical unit in accordance with claim 4, in which said light element is a light filter, and said mounting means is a spider and a ring for holding said filter in said cylinder.

7. An optical unit in accordance with claim 4, in which said cylinder has notches thereon on opposite sides of its axis, screws being provided in said holder for contacting said notches and rotatably adjusting said cylinder.

8. An optical unit for forming a plurality of elongated light slits having predetermined sizes and positional relationships to one another, comprising a plate adapted to be rotationally adjustable, said plate having openings therein in which said slits are to be formed, a bar fixedly attached to said plate and having parallel knife edges, said edges passing over said openings and forming the near sides of all of said slits, the near sides of said slits thus being parallel, a first member adjustable on said plate and having a knife edge to form the side of at least one of said slits, the knife edge of said member and one of the knife edges of said bar being in the same plane, and a second member adjustable on said plate and having a knife edge to form the sides of the other of said slits, the knife edges of said second member lying in the same plane as said other knife edges.

JAMES L. PETTUS.

REFERENCES CITED

The following references are of record in the file of this patent:

UNITED STATES PATENTS

| Number | Name | Date |
| --- | --- | --- |
| 1,839,217 | Greibach | Jan. 5, 1932 |
| 2,002,352 | Owens | May 21, 1935 |
| 2,005,068 | Batsel | June 18, 1935 |
| 2,021,232 | Fassin | Nov. 19, 1935 |
| 2,131,280 | Haas | Sept. 27, 1938 |
| 2,244,754 | Zimmerman | June 10, 1941 |
| 2,268,099 | Wein | Dec. 30, 1941 |